Figure 1:
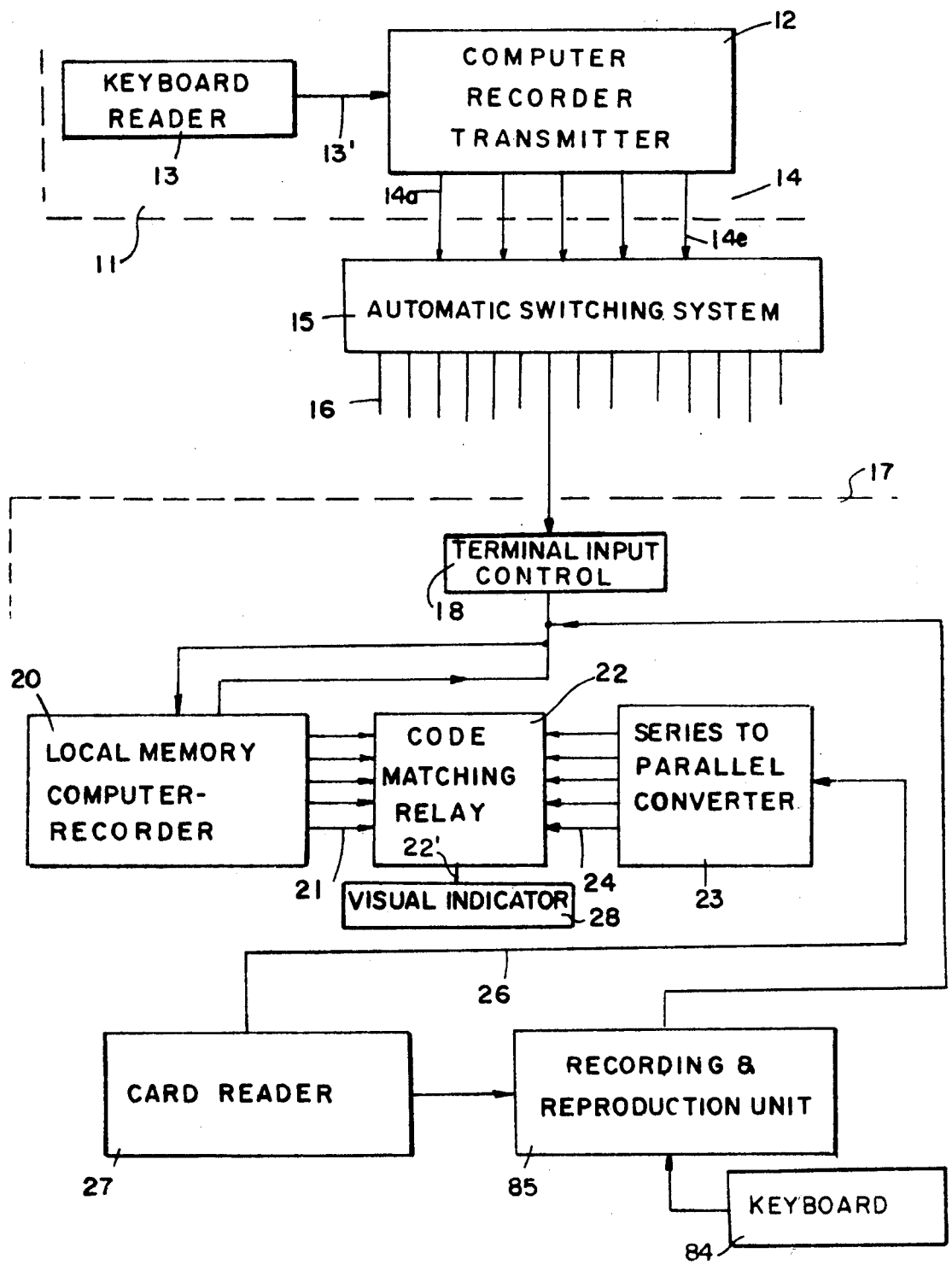

United States Patent [19]
Lemelson

[11] 3,940,795
[45] Feb. 24, 1976

[54] VERIFICATION APPARATUS USING A CARD SCANNING MEANS

[76] Inventor: Jerome H. Lemelson, 85 Rector St., Metuchen, N.J. 08840

[22] Filed: May 20, 1974

[21] Appl. No.: 471,200

Related U.S. Application Data

[63] Continuation-in-part of Ser. No. 294,662, Oct. 13, 1972, Pat. No. 3,812,461, which is a continuation-in-part of Ser. No. 30,450, April 21, 1970, Pat. No. 3,696,335.

[52] U.S. Cl. ...... 360/101; 235/61.11 D; 340/149 A; 360/2; 360/81; 360/88
[51] Int. Cl.² G11B 25/04; G11B 21/02; G11B 5/52; G11B 5/80
[58] Field of Search .......... 360/2, 88, 105, 81, 101; 235/61.11 C, 61.11 A, 61.11 B, 61.11 D; 340/149 R, 149 A

[56] References Cited
UNITED STATES PATENTS

| | | |
|---|---|---|
| 2,677,200 | 5/1954 | MacChesney .......................... 360/2 |
| 3,696,335 | 10/1972 | Lemelson ........................... 340/149 |
| 3,716,678 | 2/1973 | Staar .................................... 360/101 |
| 3,780,264 | 12/1973 | Kondur et al. ................ 235/61.11 D |

*Primary Examiner*—Alfred H. Eddleman

[57] ABSTRACT

An apparatus and method are provided for verifying the status of an account such as a credit card account or that the holder of a card is the party indicated by information recorded on the card. In one form, information is recorded on a magnetic recording strip of a card which is automatically read when a magnetic pick-up is caused to scan the recording. The signals generated are then fed to a comparator which compares same with information reproduced from a memory or signals generated in scanning a characteristic of the card holder such as a voice or photoelectrically generated signals scanning a finger print or other physical characteristic of the holder. Special card scanning means is also provided.

8 Claims, 5 Drawing Figures

VERIFICATION APPARATUS USING A CARD SCANNING MEANS

RELATED APPLICATIONS

This is a continuation-in-part of application Ser. No. 294,662 filed Oct. 13, 1972, for Credit Verification Apparatus, now U.S. Pat. No. 3,812,461, which is a c-i-p of application Ser. No. 30,450, filed April 21, 1970, now U.S. Pat. No. 3,696,335.

SUMMARY OF THE INVENTION

This invention relates to a system and apparatus for generating information by scanning and verifying the information generated. In particular, the invention is concerned with certain improvements in apparatus and systems associated with verifying an account or identifying a subscriber to the system. The apparatus includes an improved reading device for signals recorded on a magnetic strip of a card and means for comparing the signals generated when a card is so read with signals reproduced from a memory or generated in scanning the physical characteristics of the card holder.

Accordingly, it is a primary object of this invention to provide a new and improved apparatus for reading information recorded on cards.

Accordingly it is a primary object of this invention to provide a new and improved apparatus and method for automatically verifying the status of accounts such as credit of subscribers to a credit card system.

Another object is to provide a credit verification system employing card reading devices and a computer or memory system containing information on the subscribers to the system which is scanned and compared with information reproduced from a card presented to a reader wherein a signal is generated if the account represented by the card is not verifiable and wherein means are provided at each reader for preventing release of the card from the reader in response to such signal, or for otherwise invalidating the card.

Another object is to provide a credit verification apparatus employing a card reader and printing unit for information contained on a card wherein the printing unit is prevented from properly operating if the account represented by the card is not verified.

Another object is to provide a credit verification apparatus employing a card reader for credit cards at a transaction location such as a retail counter and an electronic system for verifying accounts or indicating bad accounts and means for photographing the face of the person presenting the card if the account represented thereby is a bad account or the card is a stolen card.

Another object is to provide a credit verification system employing a device for reading information recorded on credit cards for automatically verifying the status of the account represented by a card, such device being also operable to permit the entry of data by a key switch or other means into a recorder or computer.

Another object is to provide a new and improved combined credit card reader and imprinter unit which may be used to complete both credit verification and form printing with the card in a single operation. Another object is to provide a method for verifying that the card holder is the owner of a credit card.

Another object is to provide a credit verification and data entry system employing a recorder for credit information and means for utilizing the same recorder for recording business transactions after obtaining credit verification of accounts therefrom.

With the above and such other objects in view as may hereinafter more fully appear, the invention consists of the novel constructions, combination and arrangements of parts as will be more fully described and illustrated in the accompanying drawings, but it is to be understood that changes, variations and modifications may be resorted to which fall within the scope of the invention as claimed.

Figure 2:
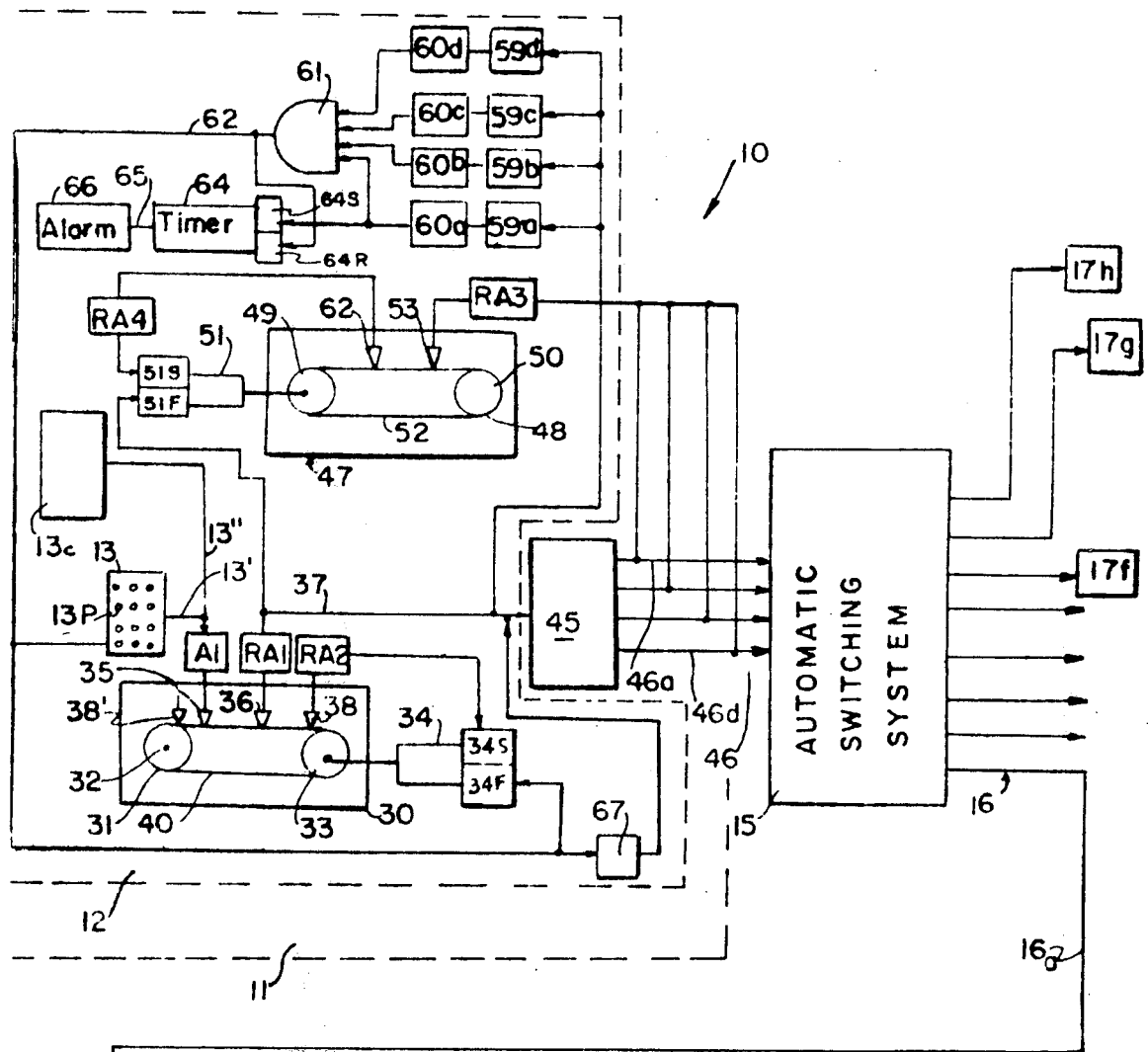
Figure 2:
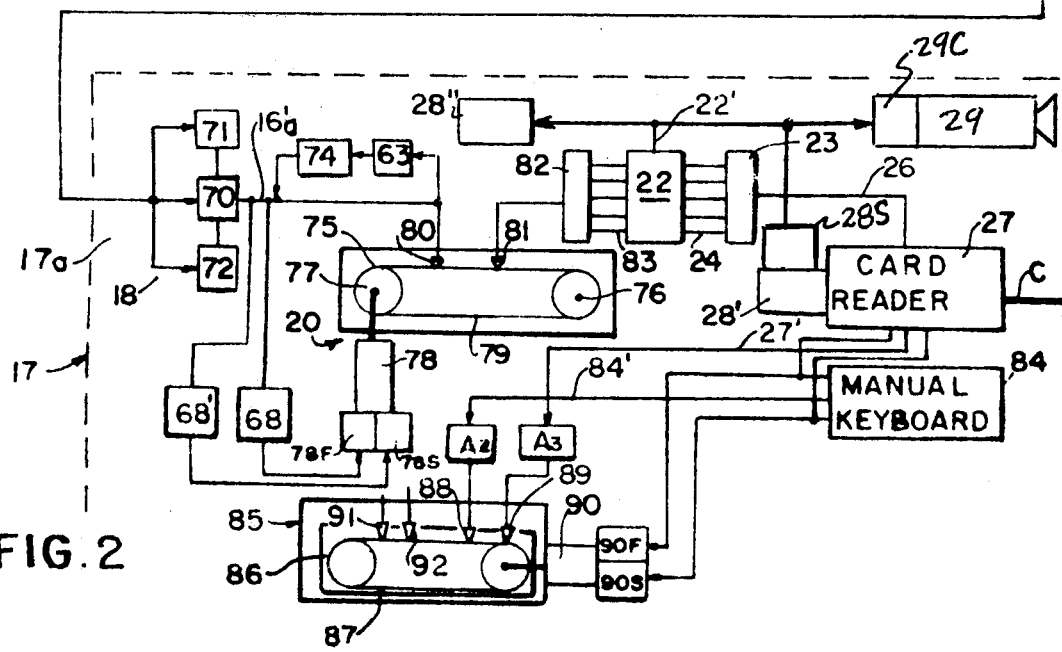
Figure 3:
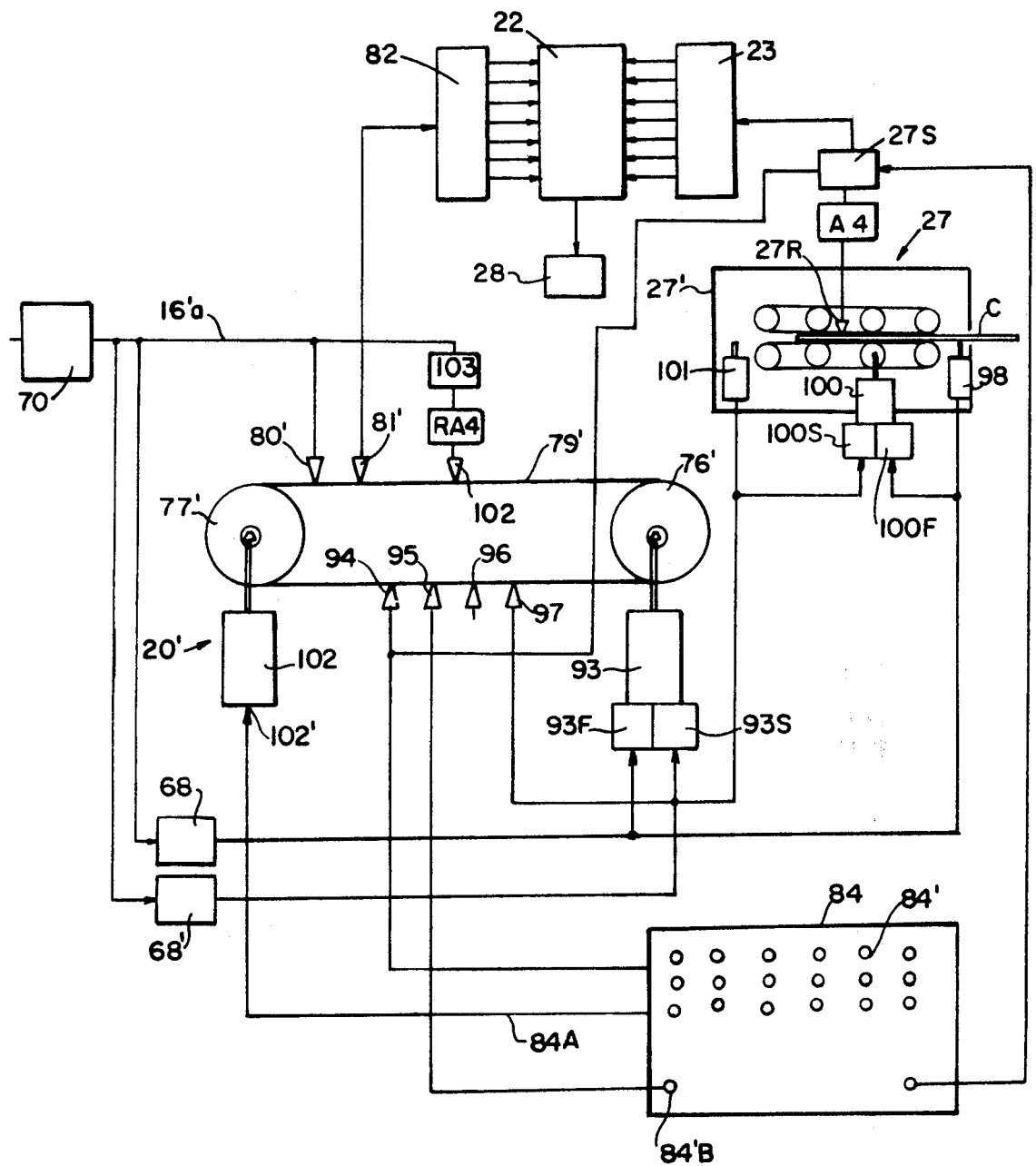
Figure 4:
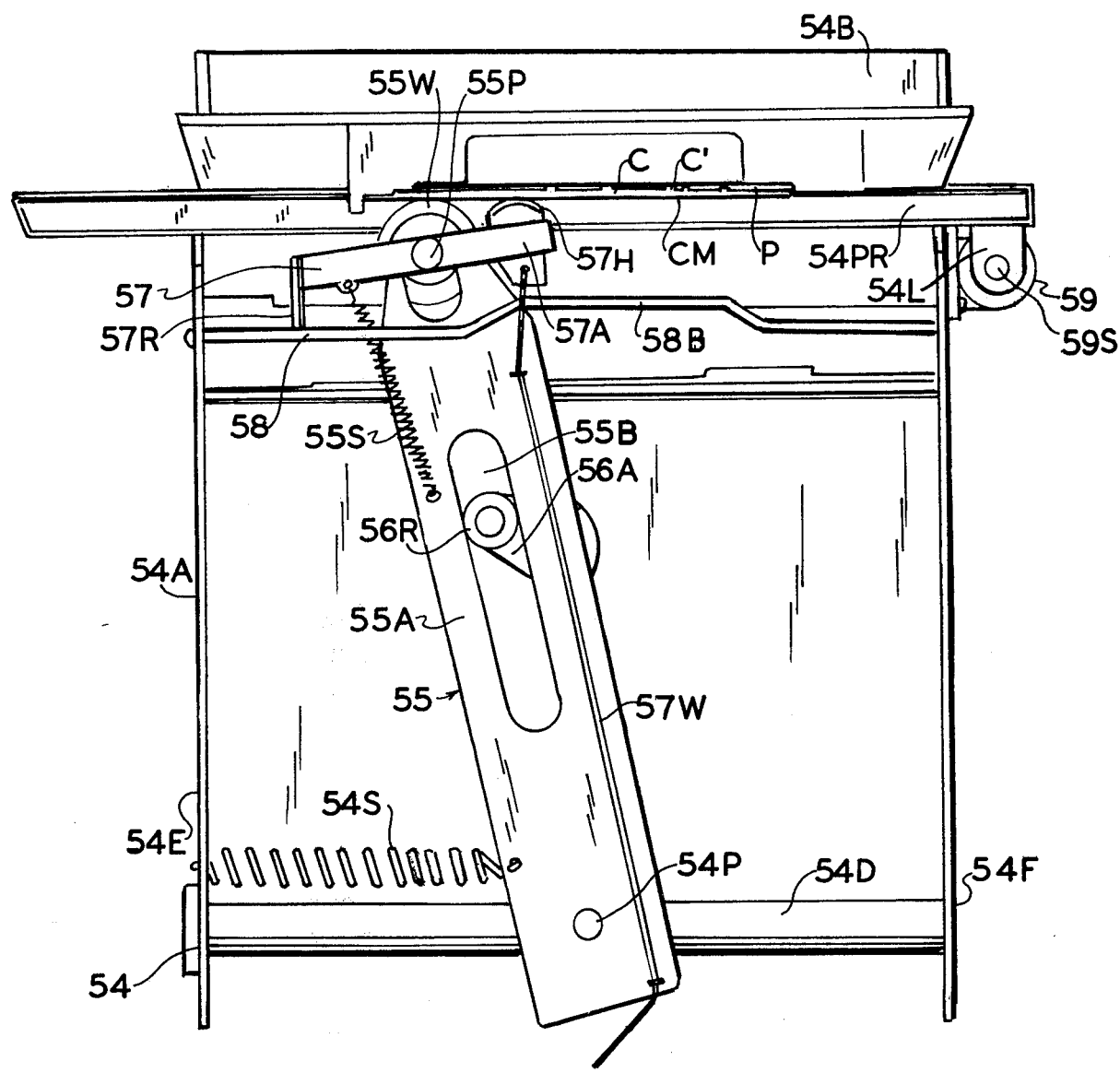

In the drawings:

FIG. 1 is a schematic block diagram of a credit verification and transaction data recording system defining the instant invention; and FIG. 2 is a more detailed schematic diagram of the credit verification system of FIG. 1, FIG. 3 is a schematic diagram illustrating a particular modified form of the invention, FIG. 4 is a plan view of a credit card printing and reading apparatus applicable to the systems of FIGS. 1 to 3, and FIG. 5 is a schematic diagram of a system for verifying that the holder of a credit card seeking credit therewith is the owner of said card.

FIG. 1 is a block diagram illustrating the sub-system components of the card verification and data entry system. The system, designated 10, is particularly applicable for verifying the credit status of scribers to a credit card service who purchase products and services on credit by presenting credit cards to clerical personnel trading in said products and services. If the cost of such goods and services is generally above a minimum amount, said $5 to $25, it is desirous to ascertain or verify if the account has a acceptable credit standing and if the person presenting the card for the goods and services is actually the owner of the card or is qualified to represent the owner and use the card.

The system 10 is composed of a central data processing station 11, preferably having a computer or recorder transmitter 12, of the type provided in my application Ser. No. 311,252 filed Sept. 24, 1963, now U.S. Pat. No. 3,511,940, or the like and a plurality of remote subscriber stations, one of which 17 is illustrated and contains the following card reading and verifying apparatus which is also provided at each of the other subscriber stations. Each subscriber station 17 has its own local recorder 20 for recording and reproducing code signals received from the central station 11 and representing, for example, all those accounts in the system pretaining to subscribers or card holders who have overdrawn their maximum allowed credit amount or have been discredited because of their failure to pay previous bills or accounts for which the credit cards have been lost or stolen. Each subscriber station 17 also contains one or more card readers 27 operative to read signals representing account numbers recorded on the cards presented to it. The reader may be made in accordance with the teachings of U.S. Pat. No. 3,434,130 entitled Record Card Scanning Apparatus. Reader 27 may also contain means for generating signals representative of variable data such as data representing products or services purchased, as provided in U.S. Pat. No. 3,434,130 and for a reading device capable of performing multiple printing and variable data generating functions applicable to such a unit.

The card reading unit 27 contains means for receiving and prepositioning a credit card and reading coded information recorded on a selected area or track of the card. Such reading is operative to generate a parallel or series code such as a binary digital code representative of the account number of the card owner. If the code generated is a series code which is generated on the output 26 of the reader 27 which is connected to a series-to-parallel code converter 23, said converter generates and holds said code in parallel on its plural outputs 24 which are connected to a comparator or codematching relay 22. The code-matching relay 22 is a comparator which may be made in accordance with the teachings of my U.S. Pat. No. 3,051,777 and other U.S. Pat. Nos. such as 3,217,293 and 2,965,720. The comparator 22 is operative to receive on a plurality of other inputs 21 all the parallel codes reproduced from the recorder or computer 20 while the parallel code generated in reproducing information from the card by reader 27 is maintained on the input 24 thereto. If one of the codes reproduced from the recorder 20 matches or is the same as the parallel code held on inputs 24, comparator 22 is operative to generate a signal indicating such condition on its output 22' which is connected to a relay forming part of a visual indicator 28 or other form of means for visually or otherwise indicating such conditions to prevent the use of the card to complete the transaction.

The system illustrated in FIG. 1 also provides means for automatically changing or updating the information recorded in the computer 20 of the subscriber stations by automatically effecting connections between a plurality of outputs 14, designated 14a to 14e, of the central data station computer 12 by means of an automatic telephone line switching system 15 having outputs 16 connected to the terminal circuits of stations 17. Such automatic connecting may be effected by an automatic signal generator at regular time intervals or in response to information entered into the recorder or computer 12, by a manual keyboard 13, or other suitable means. An input control means 18 for each subscriber station 17 for controlling the gating of information transmitted from the central data processing station to the recording input 19 of the local recorder 20 is provided connected to terminal circuit 17.

FIG. 2 is a schematic diagram showing further details of the credit verification system 10. The recorder-transmitter 12 at the central data processing station 11 includes a first memory unit in the form of a magnetic recorder 30 having a magnetic recording tape 40 drivable back and forth or in an endless path on a transport 31 illustrated as comprised of two drums 32 and 33. The latter drum 33 is shown as power rotated by a constant speed gear motor 34 to drive the tape 40 past a plurality of recording and reproducing transducers. The start and stop control 34F and 34S for motor 34 may be manually or automatically operated to effect the updating of recorded information and the playback of the recordings on the belt after suitable circuits have been established with a plurality of local verification stations 17 through the automatic telephone switching and connections system 15. Other forms of digital code recording and playback means may also be provided in place of the tape recorder 30 such as magnetic disc or drum recorders, mass memory matrices or the like, capable of generating trains of code signals representative of discredited accounts.

The system 10 is operative to permit the simultaneous transmission of codes of all discredited account numbers reproduced from recordings on the tape 40 to a plurality of receiving stations 17 each containing a local magnetic recorder and reproduction unit 20 which is of conventional design such as provided in Ser. No. 311,252. The recorder-playback unit 20 provides discredited account number signals when queried after the reading of the account number recording on a card by a card reader 27 at the verification station 17. The recorder 30 has a recording head 35 for recording series binary codes representative of discredited accounts on a track of the tape 40, a pick-up head 36 for reproducing the recordings made through head 35 and an erase head 38' which is automatically operative during the reading operation by conventional means for erasing recordings to permit their replacement with updated recordings. The recording head 35 is operatively connected to a recording amplifier $A_1$ which is connected to the output 13' of a manual key operated code generator 13 operative for selectively erasing and adding code recordings. Amplifier $A_1$ is also connected to an output 13'' of a data processing unit such as a computer 13C or card reader of the type shown in U.S. No. 3,434,130 operaative to generate code signals representative of discredited accounts.

When it is desired to update or change the recordings of discredited accounts provided in the local recording units 20 of the remote credit verifying station, connection between the output of the production amplifier $RA_1$ for the magnetic pick-up head 36 and a plurality of receiving stations 17 is first made by transmitting switching signals to the automatic telephone switching and connection system 15 to which the inputs 16 to said credit verifying stations are connected.

In FIG. 2, the output 37 of the reproduction amplifier $RA_1$ is connected to a switching matrix 45 having a plurality of branch output circuits denoted 46a to 46d which are each connected to a respective line circuit extending directly to the automatic telephone system 15. The output circuits 46a 46d are each connectable to any of the terminals 16 of the telephone system, which terminal lines are connected to respective of the verification stations 17a to 17d. Connection of the data processing station 11 with the verification stations is effected by generating the selection and connection codes or tones on the phone line circuits 46a to 46d. In the system provided in FIG. 2, such codes or tones are generated as reproduced from a magnetic recorder 47, although other types of signal generating means may also be provided. The recorder 47 has an endless loop magnetic tape 52 containing the selection and connection signals recorded in series along the tape. The tape 52 is driven on a tape transport 48 composed of a drum 49 driven by a constant speed gear-motor 51 and an idler drum 50. A first reproduction transducer 53 rides on a first tract of the tape 52 containing groups of the connection signals representing the numbers to be called for all the telephone terminal circuits of all the verification stations 17 serviced by the central data processing station 11. A second magnetic pick-up transducer 62 reproduces control signals from another track of the tape, such control signals being opertive to stop the motor 51 driving the tape each time after the number of terminal circuit selection and connection signals necessary to effect the desired connections have been reproduced and applied to connect said output circuits to respective verification stations. While the output circuits 46 may be as many as twenty or thirty in number, if they are four in number, as illustrated, the tape 52 will have groups of four terminal circuit connection codes or tones recorded to be reproduced together to effect four circuit connections on which the account code signals may be simultaneously transmitted.

Provided on tape 52 between each of said groups of four station connections codes are pulse signals adapted to be reproduced by head 62 and applied to the stop control 51S of tape drive motor 51. Thus, after each group of four tones or codes is reproduced by pick-up 53, tape drive motor 51 is stopped and remains stopped so that the next group of four codes will not be reproduced until after magnetic recorder 30 has completely cycled and reproduced all its account signals. Pick-up head 38 riding on a control track of tape 40 reproduces a pulse signal from a recording reproduced after all the account signals have been reproduced. Said pulse signal is applied to energize the stop control 54S of drive motor 34 and to start control 51F of drive motor 51 of circuit selection code recorder 47 to initiate generation of the next group of four circuit selection signals after a control signal has been generated as the result of effecting all four terminating circuit connections.

Means are also provided in the system of FIG. 2 to prevent the reproduction and transmission of the discredited account signals until all four terminal circuit connections have been made. To describe this prevention means, reference is made to the verification station 17a wherein controls are illustrated which include an input control 18 including a ring signal responsive relay 71 operative to close terminal circuit input switch 70 upon generation of the conventional telephone ring signal by the automatic switching system 15 on the line 16a therefrom. A second tone responsive relay 63 in the terminal circuit 16a for station 17a is responsive to a tone signal reproduced from tape 40 by head 36 after all of the switching and connection signals have been generated. The relay 63 operates to activate a tone generator 74 which generates a tone signal on the connected telephone circuit which signal is transmitted back to the terminal line 37 of the central station 11 and is applied to activate a tone responsive relay 59a which in turn activates a holding relay 60a closing a switch therein and gating electrical energy to a first input of an AND circuit 61. Each of the other receiving stations 17b, 17c and 17d contain similar tone responsive, tone generating means for activating respective tone relays 59b, 59c and 59d which activate holding relays 60b, 60c and 60d. When all the holding relays 60 are activaated, the AND circuit 61 generates a control signal on its output 62 which control signal is applied to the start control 34F of motor 34 for initiating cyclic opepation of recorder 30.

A timer 64 is utilized to indicate if any of the four terminal circuits of the local verification stations 17a to 17d have not been completed. The timer 64 generates a signal on its output 65 for activating an alarm 66 such as a light or buzzer if its reset input 64R is not pulsed by the signal generated on the output 62 of AND circuit 61 within a predetermined time interval after the first tone responsive relay 59a is activated. The outputs of relays 60a TO 60D are also connected to the initiating input 64S of timer 64. The time constant of timer 64 is sufficient to allow all four circuits to the local verification station 17a to 17d to be completed under normal operating conditions. The outputs of each of the tone controlled relays 60a to 60d may also be connected (not shown) to respective switches for operating electric lights to indicate to personnel at the date processing station 11 which of the circuits have not been completed. A character indicating visual display means for each circuit may also be employed activated by the call signals reproduced from tape 52 for visually indicating the call number of that terminal circuit or circuits which have not been connected so that operating personnel may note same or attempt to manually effect connection of the circuit or circuits which have not been automatically connected by means of a conventional telephone dial or push-button signal generator connected to that terminal circuit of the lines denoted 46a to 46d in FIG. 2.

The output of AND circuit 61 is also applied to a tone generator 67 connected to the terminal line 37 of the master signal generating station 11 which tone generator 67, upon receiving said signal from AND circuit 61, generates a control tone signal which is transmitted simultaneously to all the subscriber stations 17 connected, as described, to line 37. Each of the subscriber stations 17 has a tone responsive relay 68 connected to the terminal line 16' thereof. The relay 68 is operative, upon becoming activated by receipt of said tone signal, to energize a start-control 78F of the motor 78 which drives the tape transport 79 of the subscriber's recorder 20 so as to effect the recording of the account signals reproduced thereafter from the record member 40 of the recorder 30. Once recorder 30 has been initiated in its operation, after all terminal circuits to the verification stations 17 have been completed, said recorder goes through a complete cycle by reproducing all signals recorded on the tape 40 which are transmitted to all receiving stations and are recorded by means of the magnetic recording transducers 80 coupled to the tapes 79 of the recorders 20 of said verification stations. After all code signals are reproduced and transmitted, an end-of-recording signal on an adjacent track of tape 40 is reproduced by a pick-up head 38 and is applied both to the stop control 34S of motor 34 and as a tone signal as generated from a tone signal recording on a separate track of tape 40. Pick-up head 30 is connected to the output line 37 permitting transmission of said tone to all the subscriber station terminal circuits. Said received second tone signal is operative to energize a second tone responsive relay 68' contained in each of the subscriber terminal circuits. Said second tone responsive relay activates the stop-control 78S of motor 78 to terminate operation of the recorder 20 after all account signals have been transmitted thereto from the master transmitting station 11.

If conventional telephone lines are employed to transmit discredited account signals, as described, to the verification station, such transmission is preferably effected at night-time, when line use is at a minimum. Thus, updating of credit information may be effected each night or at any desired time when such updating is necessitated. After the recorder 20 of the verification station 17 has received and recorded all signals reproduced from the recorder 30 of the master transmitting station 11, local credit verification functions may be initiated. Such credit verification may be effected by inserting a card C into the verifier-reader unit 27, which generates a series code which is transmitted to a series-to-parallel converter 23 operative to hold said code in parallel array on the parallel outputs 34 thereof, which are connected to a comparator circuit 22. The comparator 22 also receives parallel codes generated on lines 83 extending from a series-to-parallel converter 82, which is connected to the code pick-up head 81 riding on the tape 79 of the recorder 20. If a code reproduced from tape 79 matches the code held on inputs 24, the comparator or code-matching relay 22 is operative to generate a control signal on its output 22' which is shown in FIG. 2 as being connected to a servo device 28', such as a motor or solenoid which operates, when so activated, to hold, mark, punch or otherwise affect the card inserted into the reader. The output 22' is also shown extending to an alarm device 28" operative to warn the clerk utilizing the credit verification sub-system at the subscriber station 17 of the discredited account condition.

FIG. 2 also illustrates a keyboard signal generator 84 which is provided adjacent to or is located within the housing in which the card reader 27 is located. Unit 84 contains one or more means for entering and recording variable data associated with each transaction as signals on a magnetic tape 87 driven in a magnetic recorder 85. The tape 87 is provided in a magazine or cartridge 86 which is operatively inserted into the recorder 85 and is driven by means of a motor 90 forming part of the recorder. The signal, generating device 84 includes manually operated switches for operating the stop and start-controls 90S and 90F of the motor 90 driving the tape 87 for recording thereon. The signal-generator 84 may comprise a keyboard containing a plurality of manually operated push-buttons for generating code or tone signals representative of variables associated with the transaction effected by means of the verified credit card C, such as the number of pieces purchased, catalog number, etc. Said information is generated as series code signals on the output 84' of device 84 and is transmitted to a recording amplifier A2 which is connected to a recording head 88 operatively located with respect to the tape 87. An output 27' of the card reader extends from a reproduction head scanning a record track of the card containing recordings representative of the account number of the card holder. Line 27' extends to a recording amplifier A3 which is connected to a second recording head 89 operatively located to transduce the signals generated on line 27' on a second track of the tape 87. Notations 91 and 92 refer to magnetic reproduction heads located in the recorder 85 for reproducing those signals recorded by heads 88 and 89. Control means, not shown, are provided in recorder 85 for reproducing the recorded signals and generating tone representations of said signals which may be transmitted on a telephone circuit, such as the circuit composed of line 16a and 46a to the station 11 which signals are applied to a tone-responsive relay (not shown) which is operative to automatically record the codes representative of said tone signals on still another recorder or present same to a computer for recording and accounting for the accredited transaction. The cartridge or magazine 86 containing the tape 87 with a plurality of transaction recordings effected by the clerk may also be manually or otherwise delivered to a master transmitter located in the store defined by the station 17 for transmission to the central computer located at station 11 or any other location, so as to provide automatic means for the transmission of transaction information to a computer for processing.

Device 28" may also represent a printer for transaction sheets of paper inserted therein with the credit card and having a roller platent operated by hand or a motor to bring the card and sheet together to print characters of the raised embossings of the card on one or more paper sheets. If the device 28" is electric motor operated, the output 22' of comparator 22 may be connected to the switching input of a normally closed switch enabling operation of the motor driving the platen. The signal generated on the comparator output 22' when the account is unverified may also be utilized to activate a solenoid or motor for preventing removal of the card from the printer housing.

It is also noted that the card reader 27 may contain means for printing characters of the raised embossings of a card inserted into said reader onto one or more transaction slips of paper to be used as a receipt by the card holder and employing a roller platen of conventional design operative to impress the moving card against a moving sheet of paper or operative when the card is held stationary within the housing of said reader. The described platen motor disenabling means and card holding means connected to the output 22' of comparator 22 may also be provided therein.

It is noted that the two recorders 20 and 85 of FIG. 2, which are respectively provided at the credit verification station for recording credit information and business transactions, may be replaced by a single-recording unit for performing both functions. FIG. 3 illustrates such a single-recording unit applicable to the credit verification station 17 and containing many of the components illustrated in FIG. 2. The single recorder 20' contains an endless magnetic tape of belt 79' driven about a transport composed of reels or drums 76' and 77' by a motor 93 having start and stop controls denoted 93F and 93S. In the credit verification mode, a card C is inserted into the card reader 27 and a transducer 27R reads information recorded on the card and representative of the card account. The output of transducer 27R is a series of code which is transmitted to the described series-to-parallel converter 23 and held in relay storage therein. As the card C enters the housing 27' of the reader 27, it operates a first limit switch 98 which activates the start control 100F of a motor 100 driving the card through the housing. The limit switch 98 also gates power to pulse the start control 93F of the motor 93 driving the endless record member 79' so as to permit the reproduction head 81' to reproduce the signals recorded on tape 79' which are indicative of unverified accounts and to transmit said signals to the series-to-parallel converter 82 which, in turn, generates all the verification codes recorded on tape 79' in parallel form at comparator 22 for their comparison with the parallel code signals held on the outputs of converter 23.

If the account represented by the card read in reader 27 is verified, the operator of the apparatus may next perform operations to effect the recording of a transaction on a separate channel of the magnetic tape 79'.

A number of techniques may be employed to position tape 79' with respect to a code recording head 94 operative to record the transaction. The code generating outputs of card reader 27 and manual keyboard 84 are connected to transaction code signal recording head 94 for recording the signals generated by the two devices on a transaction signal recording channel of tape 79' which is different from the channel or channels containing the recorded verification signals. A number of techniques may be employed to position tape 79' so that the next unrecorded portion of the channel against which head 94 rides is in alignment with said head after the tape has completely cycled one time and all of the credit verification signals have been reproduced therefrom. In its simplest form, such control may be effected by means of a timer operative to stop the motor 93 driving tape 79' in its endless path at a timed interval after it has started such that the entire endless tape has passed the heads of the recorder 20'. In FIG. 3, the means utilized to stop the tape 79' so that the next unrecorded portion of the channel on which transaction recordings are to be transcribed is in alignment with head 94, comprises recording a control signal on a separate control channel of the tape. The control signal is recorded by the operator at the end of the recordings of the previous transaction when he depresses a key 84'B of the keyboard 84 terminating said transaction. Said key 84'B is a mono-stable switch which gates a pulse to a recording head 95 riding on the control signal channel of tape 79'. The signal recorded by head 95 is reproduced by a pickup 97 riding on the same channel and is transmitted as a pulse to the stop control 93S of motor 93, which contains means for predeterminately stopping said motor so that the next unrecorded portion of the transaction signal recording channel is in alignment with recording head 94. A permanent magnetic erase head 96 is positioned with respect to the channel of the tape scanned by heads 95 and 97 and operates to erase the control signal recording effected by recording head 95 after said signal recording has been reproduced by head 97 and utilized to a stop motor 93. The operator then effects the recording of a transaction by either entering the card holder's identification number and variable information associated with the transaction by selectively operating the keys 84' of the keyboard 84 or by a combination of feeding card C through the reader 27 to generate the subscriber's identification signals recorded thereon and selectively operating keys 84' to generate said variable information thereafter. Accordingly, a bi-stable switch 27S is provided in the output of amplifier A4 for the signals reproduced by scanning transducer 27R which, when said bi-stable switch is operated by a manual key on keyboard 84 gates the output of 84 to the recording head 94, so that when the card C is next driven through the housing 27, the series signals generated in reading the card will be recorded on the transaction channel of tape 79'. Thereafter, as described, the operator depresses selected keys of the keyboard 84 to generate signals in code or tone form which are indicative of variable information relative to the transaction such as date, code associated with the article purchased, number of articles purchased, etc.

While the transaction signals may be recorded while the tape 79 is driven at a constant speed, it is preferable to record each signal or group of signals while the tape is driven in a stepping mode, so as to eliminate variable delays in recording due to variations in the time the operator takes to punch the keys 84'. Accordingly, a stepping motor 102 is provided to drive the tape 79' in a stepping mode. While motor 102 is shown operatively connected to drum 77' while the shaft of motor 93 operates in a free-wheeling mode, said motor 102 may also be operatively coupled to the same shaft driven by motor 93 which same shaft may be utilized to drive either of the drums or a capstan drive unit engaging the tape together with either or both drums, so that the tape may be properly driven either in a constant high-speed mode during reproduction of the credit verification signals therefrom or in a stepping mode during the recording of transaction signals.

An output 84A of the keyboard 84 extends to the input 102' of a stepping motor 102 and is energized to cause motor 102 to step each time any key-operated switch 84' of the keyboard 84 is depressed, so that the recording signal or signals generated by said switch will be passed to the recording heads 94 or 95 while the tape is in motion.

During the operation of automatically recording signals of unverified account numbers on tape 79', which function may be effected during a given time interval or at nighttime when the verification station is not in use, the described tone-responsive control switches 68' and 68 are activated to respectively stop and start motor 93 driving tape 79' for recording purposes.

For the purpose of simplifying the drawings described, block diagram notations have been utilized to signify relays, switches, amplifiers, logical switching circuits, motors and their controls, as well as sub-systems which are illustrated in greater detail in my parent application set forth herein. Power supplies for these components have not been included so as to simplify the drawings and it is assumed that they are provided on the correct sides of all switches, relays, amplifiers, motors, controls and logical circuits so as to effect proper and suitable operation as described. Notations RA-1 to RA-5 refer to reproduction amplifiers for signals generated in scanning recordings on magnetic tape. In certain instances, recording and reproduction amplifiers have been eliminated from the drawings and it is assumed that they are utilized where needed.

It has been previously defined that the signals recorded locally at each verification station and representative of business transactions may comprise combinations of signals generated by card reader 27 in reading a card and signals generated by selective operation of the described code generating keyboard switches, which recorded signals may be reproduced and transmitted to the master accounting or central data processing station 11 and recorded in a magnetic recorder or computer thereat. Such reproduction and transmission of local account signal information may be automatically effected during or immediately after an automatic connection has been made, as described, between the central data processing station 11 and the verification station by providing suitable controls for the recorder at the verification station and generating suitable control signals at said central station and transmitting same on the connected line. In the arrangement illustrated in FIG. 3 the recorder 20' is controlled to start and stop as described by signals transmitted on the connected line from the central or master station which signals may be specific tone signals to which the tone responsive relays 68 and 68' are responsive for energizing the start and stop controls 93F and 93S of the tape drive motor 93. A reproduction head 102 riding against the same channel engaged by recording head 94 reproduces the card generated account information and variable signal information generated by keyboard 84 as pulse signals and applies said pulse signals to a tone generator 103 connected to the reproduction amplifier RA5 thereof. The output of tone generator 103 is connected to the terminal circuit 16'a and the tones generated thereby are transmitted back to the master or central station connected thereto. A tone responsive relay (not shown) at said master station is connected to receive and be activated by the tones generated by generator 103 and is operative to generate corresponding signals each time it is so activated on the input of a magnetic recorder for recording the information reproduced by head 102. The above described operation of generating, transmitting and recording transaction information may be effected simultaneously as signals representative of unverified accounts are transmitted to the verification station or prior to or after the transmission of said verification signals. The operation is preferably effected during one cycle of the magnetic tape past all heads and erasure of the accounting signals from the record channel scanned by head 102 may be automatically effected by a permanent magnetic erase head located downstream of head 102 or by an erase head activated by signals transmitted from the master station.

Thus it is seen that if a single recorder-reproduction unit such as 20' is utilized for the purposes described, it may be employed to periodically and automatically update credit information and automatically transmit transaction information to a computer at a central processing master station.

Separate recording units for credit and transaction information may also be utilized as shown in FIG. 2 and may be operated simultaneously by means of suitable tone responsive relays and controls to effect the simultaneous recording of credit information and reproduction of accounting information. The endless belt recorders described may be replaced by suitable magnetic disc, drum or card recording and reproduction units.

It is also noted that the described local memory in which credit information is stored for comparison with the information derived in reading cards may be accessible to a number of sales or credit verification stations such as the sales locations of a single store or group of stores having line access thereto. A recorder 20 of the type shown in FIG. 2 may be operated continuously in the playback mode to constantly generate discredited account signals on a plurality of output lines each extending to a separate comparator unit associated with a sales transaction station or credit check station.

The described magnetic recorders may also be replaced with other forms of erasable or updatable recording means. For example erasable mass memory matrices may be employed wherein account signal comparison with discredited account signals recorded therein may be effect almost instantaneously. Thus where ever the term local recorders is employed, it is assumed that it may comprise a magnetic tape, disc, belt, or drum recorder or other form of recorder or memory having signals representative of discredited or accredited accounts if the latter are employed for verification purposes.

The system described may also be applicable for verifying or checking information other than that associated with credit such as security information, membership information, and perhaps even information associated with legal matters.

Other features of the instant invention include the optional use of a recording device located adjacent the card reading apparatus for recording the image of the face of the person presenting the card to the clerk operating the card reading machine, the operation of a motion picture camera or video-camera recorder scanning the area adjacent the credit verification station. In FIG. 2 the output of comparator 22 is also shown connected to a solenoid 29S which, when activated by the signal generated by said comparator or a signal generated thereby, operates the film advance the shutter mechanism of an automatic camera 29 which is operable to take a picture of the person presenting the card which has just been read by the card reader 27. The camera 29 may also be a motion picture camera or a series of cameras adapted to scan the area adjacent the retail counter or desk containing the card reading and verifying apparatus described. Notation 29C may thus comprise a multi-circuit controller or timer operable to control the camera or cameras to effect the taking of one or more pictures of the person presenting the card to the clerk or reader 27. The camera 29 may also be operated by manual closure of a switch by the clerk or by a combination of such switch closure and a signal generated on the output 22' of comparator 22.

The described credit card verification and recording system may also be employed with conventional credit cards having character embossings or moldings therein in the form of numerical and/or alphabetical characters to be impressed or printed onto a sheet of paper such as a sales slip to permit visual identification of the account and card owner for record keeping, purchase receipting and the like. Both manual and electric motor driven devices have been developed which have accomodations for receiving both such a credit card and two or more sheets of record paper with suitable carbon paper disposed therebetween to effect visible character recordings on the sheets when the card is impressed thereagainst. In FIG. 4 is shown a motor operated device 54 for simultaneously performing multiple operations with respect to a credit card containing raised embossings in the form of characters defining the name and/or account number of the subscriber or card holder and also having a magnetic record strip extending parallel to the embossed character line. The device 54 is capable of simultaneously magnetically reproducing signals recorded on the record strip of the card and impressing the embossings of the card against a plurality of paper sheets containing carbon sheets or coatings thereon to effect the printing of the characters thereof on the multiple sheets so that the card owner's name and/or number may be visually read from the sheets. While the device 54 may comprise any suitable mechanism which will compress a card which is prepositioned therein with paper record sheets, in FIG. 4 it is a modified form of motorized card printer such as the Addressograph 40 manufactured by the Addressograph Multigraph Corporation of Cleveland, Ohio. It is composed of a main assembly 54A to which is hingedly attached a second assembly 54B having a recepticle 54P for holding and prepositioning an assembly of oblong record sheets of paper and carbon, denoted P, in alignment with a credit card C which is disposed in a flat cavity 54R in the face of the plate defining the front of the assembly 54B. An arm assembly 55 contains a freely rotating wheel 55W pivoted on a pin 55P near one end thereof and is pivoted on a pin 54P near the other end thereof, which pin is supported by a heavy rod 54D extending between the side plates of assembly 54A as shown. The arm assembly 55 is caused to rotate through an angle of about 30° when a motor, located within the assembly 54A behind the front wall 54C thereof, rotates an arm 56A having a roller 56R at its end which roller engages in a slotted, elongated opening, 55B in the arm 55A. As the arm pivots, the wheel 55W rolls against the sheets P of paper causing them to be compressed against the surface of the credit card C from which the embossed characters protrude so as to form impressions or printings of the characters on the sheets of paper. The apparatus described so far is typical of the Adressograph 40 printing machine.

Modifications which may be made to the device 54 to permit it to magnetically reproduce code signals recorded on a magnetic code strip which is predeterminately disposed along the card include the provision of an assembly 57 which includes an arm 57A which is pivotally assembled to the pin 55P. A finger 57R projects laterally from arm 57A at one end thereof and is adapted to ride against a track 58 which is a bent rod extending across the main assembly 54A and supported at its ends by the side walls 54E and 54F of said main assembly. A tension coil spring 55S is connected at its ends to arm 55A and arm 57A so as to bias the finger 57R of the latter against the side surface of track 58. Pivotally supported and spring biased at the other end of arm 57A is a magnetic reproduction head 57H having wires 55W extending therefrom along arm 55A for conducting electrical energy to the head and the modulations thereof caused when the head scans the magnetic recordings of a card.

The track 58 is shaped to guide the magnetic head 57H into and out of engagement with the magnetic recording strip of the credit card as arm 55A is pivotally driven and causes the head to sweep across the face of the card. Thus the head 57H is only engaged with that portion of the card or strip thereof containing magnetic recordings and is retracted off the surface of the card after the magnetic recordings have been reproduced so that the head mount is not detrimentally affected and wear on the head is minimized. The wires 57W may extend directly to the described computer or comparator circuits or through a bistable switch to either the comparator circuit or the magnetic recorder for recording a transaction after credit has been verified.

In FIG. 4 a solenoid or motor 59 is shown mounted on the side wall 54F and has a shaft 59S which, when projected by a signal which is indicative of a bad account, passes through a hole in a lug 54L secured to assembly 54B thus preventing the latter from being pivotally opened from main assembly 54A and retaining both the card and printed sheets between the two assemblies until the solenoid 59 is again activated or released. It is noted that if solenoid 59 is not actuated as a result of not generating a bad account signal, the assembly 54B may be manually or automatically opened allowing the card and sheets printed with the card characters to be immediately removed to complete the business transaction.

The card C used in the device 54 of FIG. 4 may comprise a conventional plastic credit card having the code bearing magnetic strip CM disposed on either the same face of the card from which the character embossings C' protrude or the opposite face thereof and extending parallel to the longitudinal axis of the card in the direction in which the magnetic reproduction head 57H is caused to scan. If the card C contains the magnetic recording strip CM on the face thereof which is opposite that from which the embossed character formations C' protrude, then the paper sheet or sheets P may be disposed between the front face of the assembly 54B and the card with the card embossings C' facing the paper and forced when wheel or roller 55W rolls against the face of the card containing the magnetic recording strip CM as the head 57H engages and scans the magnetic recordings on the strip CM. If the card C contains the magnetic strip CM on the same side or face from which the embossings C' protrude, the paper recepticle 54PR and the recepticle for the card formed in the front face of assembly 54B are designed so that the portion of the card containing the raised characters C' is aligned with a portion of the paper while the portion of the card containing the magnetic strip CM overhangs the longitudinal edge of the paper and is aligned and exposed to the magnetic head 57H to permit reproduction transducing of the signals recorded thereon.

Head 57 is preferably pivotally mounted on a lateral extension of arm 57A so as to permit it to pivot a slight degree about an axis which is parallel to the scanning axis of the head and is spring biased to maintain it normal to the face of a flat card disposed against the face of assembly 54B to maintain it in transducing relationship with the record strips of cards which are slightly warped.

Figure 5:
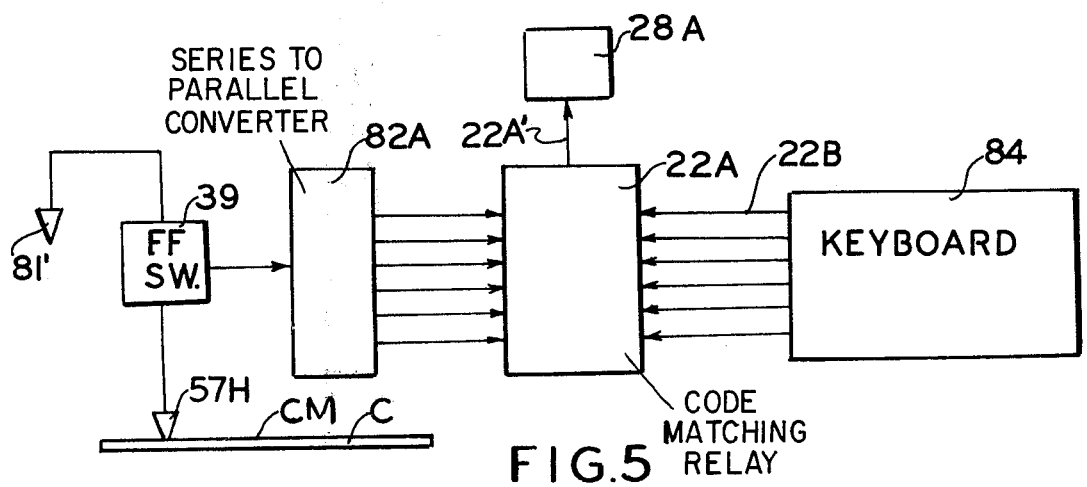

The described card reading apparatus may be utilized as a means for identifying the holder of the card as the owner thereof FIG. 5 illustrates one form of personal identification system which may be employed with the card reading and account verification apparatus described. Recorded on the magnetic strip CM of a credit card C is a binary digital code or series of code signals which are representative of a particular number which is known only to the card holder. The number may be, for example, the numbers associated with the day, month and year of birth of the card owner or any other number which he may easily remember. This number may be recorded on the same track of the magnetic strip CM containing the account number described or an auxilliary track adjacent thereto when the card is driven past the magnetic reproduction head 57H as described or as the head is driven across the card. It is passed to the input of a series-to-parallel converter 82A having parallel outputs on which the number in parallel code is generated which extend to first inputs of a code matching relay 22A of the type described. The same number is entered in code form by selective closing of switches of keyboard 84 which generates and holds the parallel code on matching inputs 22B to the code matching relay 22A until the card magnetic code is read. If the two codes inputed to code matching relay 22A match when the card is read, the relay generates a signal on its output 22A' which is passed to an electrically operated device 28A which may comprise a latching relay for an electric light or one utilized to cause a solenoid or motor such as 59 of FIG. 4 to unlatch the lock for the card reader permitting the card and record sheet to be removed therefrom. In FIG. 5, a manually operated bistable switch 39 is provided in the output of head 57H and the described reproduction head 81' permitting the same code matching circuits to be used to both identify the card holder and verify the credit or authenticity of the account.

The card holder verification system of FIG. 5 may be modified whereby means other than the manual input of numerical data to the comparator may be provided to verify that the person presenting the card is actually the card owner. For example, voice or fingerprint identification means may be utilized as a replacement of the digital code signal comparator. The keyboard may be replaced by a microphone wherein the card holder speaks certain predetermined words therin and the resulting analog electrical signals are transmitted to a comparator thereof and signals of the same voice recordings reproduced from the magnetic record strip of the card as described. The signals recorded on the card are derived from recording the audio signals generated by the same spoken words of the card owner on the magnetic strip of the card. By automatically sampling similar portions of both signals and comparing their frequencies and amplitudes, determination may be had if the person presenting the card for credit and speaking into the microphone is the person who made the audio recordings on the card. Both signals may also be automatically digitized and the digital signals derived therefrom compared in an automatic comparator as described.

Other forms of the invention are noted and include means other than the impression of card embossings against a sheet of paper to effect recording of the card contained information on a sheet. For example, magnetic recordings representative of the card account may be provided on the card as described or in other forms, may be reproduced therefrom by a transducer scanning same as described and may be recorded onto a magnetic record strip forming part of the sales slip or transaction sheet with or without the provision of visual printing by means of the card embossing described. By compressively engaging the magnetic record strip of the card against a magnetic recording material disposed on the transaction sheet or sheets and applying suitable heat or electromagnetic radiation such as a suitable magnetic field between the two, the information recordings on the card may be made in the magnetic recording material of the sheet without the necessity of scanning the card with a magnetic transducer.

Photographic or xerographic means may also be employed to record information contained on the card, such as printed name and address, account numbers and the like on the transaction sheet by suitable optical scanning and exposure means associated with the card reader. Heat from a source such as an induction heater, laser or other source thereof, may be directed through the card or reflected off its surface facing the transaction sheet which may contain a heat sensitive coating. Characters such as the name and address or account number of the card owner, printed in light reflecting or light absorbing material or formed in a mask laminated to the card, may have their outlines or configurations recorded on such heat sensitive recording material by variations in the heat passed through or reflected off the card as modulated by such printings or maskings which provide predetermined inflections in the heat applied to the light sensitive recording material.

I claim:

1. A scanning reproduction apparatus for picking up signals recorded on record tracks of record members made of sheet material, such as cards or strips containing information recorded along selected portions thereof comprising:

a support, means for prepositioning a record sheet member on said support, a scanning mechanism including an arm, means for pivotally supporting said arm on said support adjacent to said sheet prepositioning means, a scanning transducer supported by said arm and operable for generating output signals of information contained on a record sheet scanned thereby, means for power driving said arm in pivotal movement on said support to cause said arm to carry said transducer across said prepositioned record sheet member to permit said transducer to scan information recorded on a selected portion of said sheet member, means for controlling said means for power driving said arm to cause said arm to move in a first direction from a home location so as to carry said transducer in a given path across said sheet member while said transducer scans and transduces with respect to said selected portion of said sheet member and means for thereafter causing said arm to return to said home location.

2. A scanning apparatus in accordance with claim 1 wherein said transducer is a magnetic pick-up and said record sheet member contains a magnetic recording material having information recorded along a record track defined by at least a portion of said magnetic recording material.

3. A scanning apparatus in accordance with claim 2 including means for spring biasing said magnetic transducer on said arm to urge said transducer into engagement with the magnetic recording material provided on said magnetic record sheet member as the transducer is carried across the face of said sheet member.

4. A scanning apparatus in accordance with claim 2 including means for urging said magnetic transducer into engagement with the magnetic recording material provided on said record sheet member when a selected portion of the sheet and said transducer are in alignment with each other.

5. A scanning apparatus in accordance with claim 4 including means for pivotally supporting said arm during its rotation from said home location to carry said scanning transducer across the face of a record sheet member which is predeterminately located on said support.

6. A scanning apparatus in accordance with claim 3 including wheel means supported by said arm and operable to engage the face of a record sheet member as said arm is power driven to guide said arm in movement across said record sheet.

7. In a magnetic reproduction apparatus for reproducing signals magnetically recorded on cards predeterminately located on said apparatus by means of a magnetic pick-up and means for relatively moving a card and said pick-up in a first direction to bring the pick-up into alignment with a magnetic record track of the card, the improvement comprising a first support for predeterminately locating said magnetic record card, a second support for supporting said magnetic pick-up, means for effecting relative movement of said first and second supports in a first direction to cause the pick-up to scan parallel to the record track of a card held by said first support and means for relatively moving said pick-up and card in a second direction during the relative movement in said first direction to cause said pick-up to engage the magnetic recording area of said card for reproducing the magnetic recordings thereon and further means for effecting movement of said card and magnetic pick-up in a third direction to disengage said card and pick-up.

8. A magnetic reproduction apparatus in accordance with claim 7 including means relatively moving said pick-up and card in a fourth direction to relative locations at which said card and pick-up are positioned prior to the movement thereof in said first direction.

\* \* \* \* \*